March 18, 1941.　　　　M. BRUCE　　　　2,235,139
RADIO ANTENNA SYSTEM
Filed Jan. 11, 1939
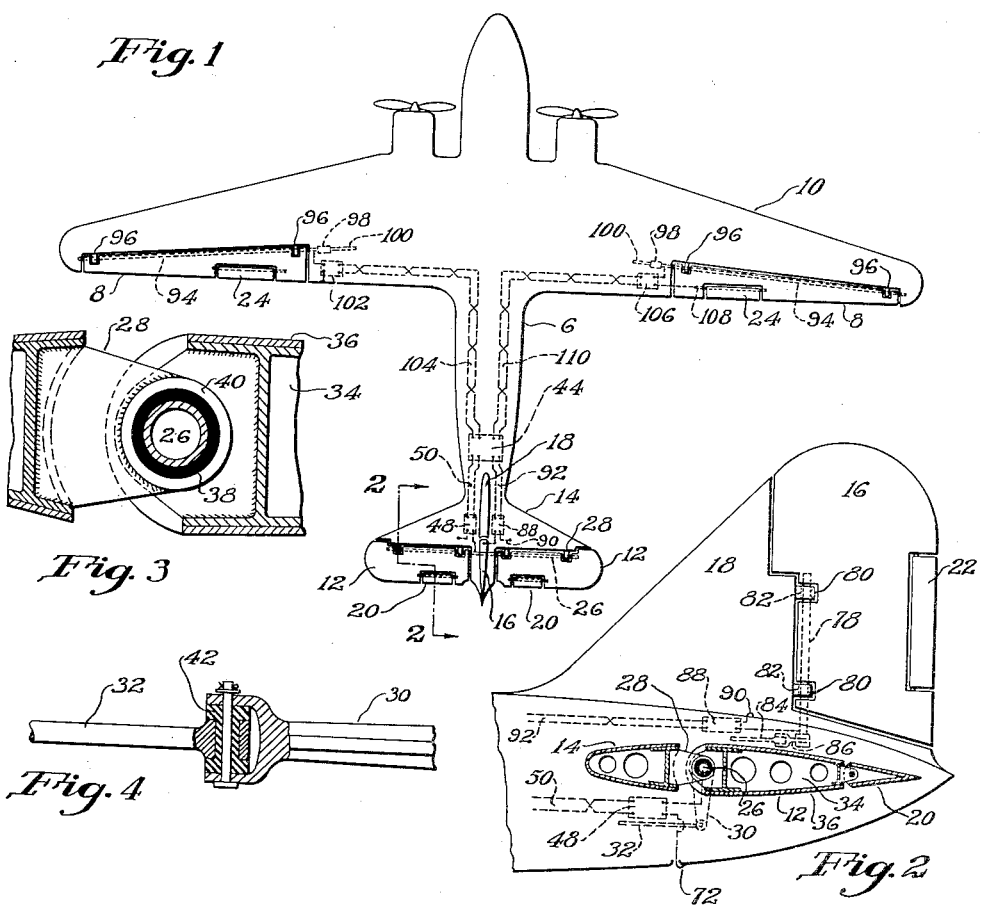
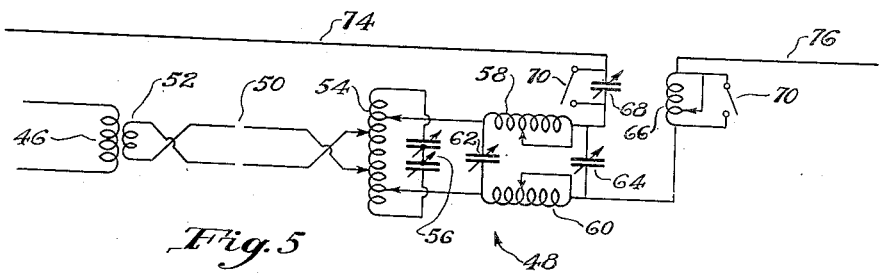
Witness
Paul F. Bryant
Inventor
Malcolm Bruce
by his attorneys
Fish, Hildreth, Cary & Jenney Patented Mar. 18, 1941

2,235,139

UNITED STATES PATENT OFFICE 2,235,139

RADIO ANTENNA SYSTEM

Malcolm Bruce, Plymouth, Mass.

Application January 11, 1939, Serial No. 250,322

4 Claims. (Cl. 250—33)

The present invention relates to radio antenna systems for aircraft, and more particularly for airplanes, for the collection and radiation of electromagnetic waves and other forms of radiant energy.

Heretofore it has generally been the practice to employ as an antenna for airplanes and other aircraft a trailing wire antenna, the wire being insulated from the aircraft structure and electrically coupled to the radio equipment within. The structure of the airplane is employed as a counterpoise or "ground," and the whole system thus functions substantially as a Marconi-type antenna.

The trailing wire antenna, though effective as a radio antenna, possesses certain mechanical disadvantages such as high wind resistance, which substantially reduces the speed of the craft, susceptibility to structural failure, and its limitation on the maneuverability of the craft, which prevents its use on military aircraft.

As an alternative to the trailing wire antenna, wires are frequently mounted externally along the fuselage, or between the fuselage and other parts of the craft, or short rods employed as the antenna proper, the structure of the airplane serving in each case as the counterpoise as in the trailing wire system. Such arrangements are generally not as effective, by reason of their limited size, as an antenna of the trailing wire type, and are subject to the same mechanical objections of high wind resistance and susceptibility to mechanical failure.

The present invention has for its object to obviate all need for any externally mounted antenna system for aircraft and to utilize instead the electrically conductive portions of the craft as an effective and self-contained radio antenna system for the radiation and collection of electromagnetic waves over a comparatively wide range of frequencies.

To this end, in accordance with a feature of the present invention, one portion of the electrically conductive structure of the airplane is insulated from another portion thereof, and the mutually insulated structural portions employed as a self-contained antenna system of the so-called series-tuned type.

By rendering the conductive structure of the craft operable as a series-tuned antenna system, that is, with antenna tuning means inserted in series between mutually insulated portions of the aircraft, the said structure may be utilized in a manner which permits the aircraft itself or a portion thereof to serve as the sole radiating element, as distinguished from the antenna system heretofore employed, where the craft, by reason of its relatively high capacitance per unit length as compared to that of the external wire or rod type antenna, is substantially the equivalent of a ground or counterpoise.

In addition, operation of the aircraft structure as an antenna of the series-tuned type permits, as will hereinafter appear, substantial flexibility of adjustment, so that efficient operation may be obtained over a comparatively wide range of fundamental and harmonically related frequencies not limited by the equivalent electrical dimensions of the structure.

It is, of course, essential that the insulation of one portion of the airplane structure from the remainder thereof, as contemplated by the invention, be effected without in any way weakening the structure of the craft, or interfering with its aerodynamic efficiency. On the other hand, optimum conditions for operation of an antenna as a series-tuned system are met when the antenna system is tuned and also coupled to the radio equipment at a point where a current antinode exists on the antenna. It is therefore desirable that the portion or portions of the airplane structure which are electrically isolated from the rest of the craft possess equivalent electrical dimensions which correspond, in general, to an odd number of quarter wavelengths of such frequencies as may be employed, in order that there may be a current antinode in the vicinity of the point where the portions of the aircraft structure are insulated one from the other.

The division by insulation of the usual metallic and metal clad aircraft structure near a current antinode is not entirely practical, both by reason of the structural problems involved in case such point is located somewhere along the fuselage of the craft and because of the shift in the location of the current antinode to some other portion of the craft with a change in the operating frequency of the system. To reduce to a minimum, therefore, the structural problems involved in insulating one portion of the craft from another, while making possible effective operation of the structure of the craft as a series-tuned and series-fed system, a feature of the invention involves the insulation of one or more of the relatively movable airfoils or control surfaces of the aircraft from adjacent airfoil members, or from the remainder of the craft, at the points of support of the said member or members. Since these members, more specifically in the case of airplanes, the ailerons, the elevators, and the rudder or rudders, are customarily mounted for pivotal movement with relation to the fixed airfoils or wing surfaces, insulation of the concentric type, such as bushings or sleeves of insulating material may be employed, as hereinafter described, at the pivotal mounting points for these airfoil members to provide effective electrical isolation without risk of structural failure.

While the electrically conductive structure of the movable airfoils of the conventional aircraft is generally not as large, in its equivalent electrical dimensions, as other portions of the structure of the craft from which the movable airfoils may be insulated, the combined structural portions may nevertheless be caused to operate as an effective series-tuned and series-fed antenna system. To this end, there is included in the antenna system adjustable reactive means by which the current distribution in the system may be modified so as to cause a current antinode to occur at or near the point at which the antenna tuning and coupling means are connected into the antenna.

To enable the aircraft structure to be brought into resonance with the radio equipment for efficient transfer of energy over a comparatively wide range of frequencies, the coupling means through which the radio equipment is coupled to the antenna is preferably of a type which affords substantial flexibility of adjustment, for example a pi-section impedance matching network. Such a coupling network, when employed in conjunction with a series tuned antenna system, permits operation on frequencies substantially independent of the physical dimensions of the particular antenna structure employed.

In the drawing illustrating the invention, Figure 1 is a plan view of an airplane of conventional design, in which the movable airfoils, comprising the ailerons, elevators, and rudder, are insulated from the remainder of the craft in accordance with the invention, the electrical coupling means for coupling one or more of the members to the radio equipment being schematically illustrated; Figure 2 is a detail view in side elevation of the tail portion of the airplane, partly in section, taken along the line 2—2 of Figure 1 and illustrating the manner of insulating certain of the movable tail airfoil members from the rest of the airplane structure; Figure 3 is a detail sectional view on a somewhat larger scale of an insulating mounting for a movable airfoil; Figure 4 is a detail view, partly broken away, illustrating an insulating connection for the actuating mechanism of a movable airfoil and Figure 5 is a diagrammatic equivalent electrical circuit of the antenna system, illustrating a typical arrangement of antenna tuning and coupling apparatus and with the equivalent electrical dimensions of the mutually insulated structural portions of the aircraft represented in linear fashion.

The airplane illustrated is of conventional design, representative of the so-called transport type of aircraft having a metallic structure and with a metal "skin" or covering on the fuselage 6 and various airfoil members. For controlling the craft in flight, the usual movable airfoils are provided comprising the ailerons 8 pivotally mounted along the trailing edge of the main wing 10, the elevators 12 similarly mounted on the fixed horizontal tail wings or stabilizers 14, and the rudder 16 carried by the vertical fin 18.

Supplementary adjusting or trimming airfoils are also provided, the elevator trimmers being indicated at 20, the rudder trimmer at 22, and the trimmers for the aileron at 24, the various trimmers being mounted for pivotal movement relative to the airfoils to which they are attached.

The elevators 12 are secured to a tubular shaft 26 extending transversely of the fuselage and pivotally supported in brackets 28 extending rearwardly from the trailing edge of the fixed stabilizers 14. Connections of conventional arrangement are provided for controlling the movements of the elevators, these connections comprising an arm 30 secured to the shaft 26 and a rod 32 extending from said arm forwardly to the usual cockpit controls.

In accordance with the preferred embodiment of the invention, the entire metallic structure of the elevators, consisting of both the internal structure 34 and the metal skin or covering 36, together with the similar structure of the elevator trimmers 20, is effectively insulated from the remainder of the aircraft by means of bushings 38 of insulating material which surround the shaft 26 and fit within cylindrical bearings 40 carried by the supporting brackets 28. An insulating bushing 42 is likewise provided at the pivotal connection between the elevator control rod 32 and the arm 30, as illustrated in Figure 4, the actuating connections for controlling the trimmers 20 being similarly insulated.

It is thus apparent that a substantial portion of the structure of an airplane may be isolated electrically from the remainder of the craft by the use of only a small amount of insulation employed at a few supporting points, resulting in small losses due to leakage currents. Losses caused by capacitance effects between the mutually insulated structural portions are likewise low, by reason of the relatively wide clearance or gap between the movable airfoils and the adjacent fixed structure, which gap or clearance is necessary for proper movement of the control surfaces. Furthermore, by employing insulation of the concentric bushing type at the pivotal mounting points for the elevators, the structural safety of the craft is in no wise affected, since even in the remote event of complete mechanical disintegration of the insulating material, the elevator supporting shaft 26 would remain held for pivotal movement in the bearings 40 of the brackets 28.

The radio equipment, indicated at 44, may be located in any convenient portion of the craft, for example in the tail portion of the fuselage, as illustrated in Figure 1, the equipment in such case being remotely controlled from the forward section of the craft. The radio equipment is preferably insulated from the fuselage structure, or at least isolated as to radio frequency energy by means of radio frequency choke coils placed where necessary in accordance with conventional practice. The said equipment may comprise any type of high frequency apparatus such as a transmitter or a receiver, or both, the antenna system of the invention being effective for either the radiation or collection of electro-magnetic waves. Such equipment is sufficiently indicated in the schematic diagram, Figure 5, by the inductance 46, which may be taken to represent, for purposes of illustration only, the output inductance of a radio transmitter.

The radio equipement 44 is connected to the mutually insulated portions of the aircraft structure through tuning and coupling means which includes an impedance matching network by means of which the aircraft structure may be tuned and coupled to the radio equipment for operation over a range of frequencies not necessarily dependent on the equivalent electrical dimensions of the structure of the craft. This network, indicated generally at 48, is insulated from the aircraft structure and is preferably located in close proximity to the coupling point or point of connection to the said structure, as illustrated in Figure 2, the network being connected to the radio equipment through a two-wire transmission line 50, such as a transposed line, a concentric line or the like. The line is coupled to the inductance 46 by the usual link coupling coil 52, while the other end of the line 50 is terminated by a parallel tuned circuit comprising an inductance 54 and a split-stator variable capacitance 56, to which circuit the input section of the impedance matching network is connected. This network may be of any suitable type which permits the matching of impedances over a comparatively wide range of values, the network illustrated being of the so-called "pi-section" type comprising variable inductances 58 and 60 and input and output tuning capacitances 62 and 64.

Since the point at which the radio equipment is coupled to the aircraft structure is in most cases considerably removed from an approximate current antinode on the aircraft structure, which is the point of optimum coupling for a series-fed system, it is generally desirable to alter somewhat the reactance to space of that portion of the antenna system having the smaller equivalent electrical dimensions, in order to obtain a more suitable current distribution in the antenna relative to the point of connection of the tuning and coupling apparatus. In the preferred embodiment of the invention, the reactance to space of the elevator structure may be altered when necessary by the provision of an adjustable reactance, generally inductive, connected in series between one side of the coupling network and the metallic structure of the elevators. This variable inductance, illustrated at 66, may be included with the coupling network unit 48 which is mounted in the tail portion of the craft close to the elevator supporting shaft 26. By proper adjustment of the inductance 66, the reactance to space of the elevator structure may be given a value which affords a current and voltage distribution on the aircraft structure such that a current antinode of the system occurs at or near a point between the elevators and the remainder of the craft. Since this point is the point of coupling of the radio equipment to the aircraft structure, efficient operation results.

Due to the rather broad resonance characteristics of the aircraft structure, the variable inductance 66 in series between the coupling network and the elevator structure will ordinarily permit proper adjustment of the system for effective operation at the desired frequency. Under certain conditions, however, it may also be found desirable to include a variable reactance in series between the other side of the network and the portion of the aircraft structure having the greater equivalent electrical dimensions. Such reactance may be either inductive or capacitative but will generally be capacitative, as indicated at 68. Switches 70 connected across the variable capacitance 68 and the variable inductance 66 permit either or both reactances to be shorted out from the circuit when conditions require.

The output terminals of the coupling network 48 are connected to the mutually insulated portions of the aircraft structure by short and direct leads as indicated in Figures 1 and 2. The side of the network which includes the variable inductance 66 is shown connected to the elevator supporting shaft 26 at or near the midpoint thereof, while the other output terminal of the network is connected to the metallic fuselage structure of the craft at a point close to the network. By reason of the tendency of high frequency energy to flow principally on the outer surface of a hollow conductor, the connection to the metallic fuselage structure is made at a point on the exterior of the fuselage 6, as illustrated at 72 in Figure 2 of the drawing.

In the equivalent electrical arrangement of the system illustrated in Figure 5, the portion 74 may be considered to represent in linear fashion the equivalent electrical dimensions of the main portion of the aircraft structure, and the portion 76 the equivalent electrical dimensions of the structural portion insulated therefrom, namely, the elevators 12 and the trimmers 20 carried thereby. The system may thus be defined as a so-called Hertz antenna of the series-tuned and series or current-fed type, with the coupling point somewhat displaced from the electrical midpoint of the system, where, for example, a current antinode would ordinarily appear in the case of operation as a half-wave antenna. By reason, however, of the high capacity per unit length of the various portions of the aircraft structure, the reactance to space of the elevators may be readily adjusted by the use of one or both of the variable reactances 66 and 68, in conjunction with the impedance matching network 48, to cause a current antinode to appear at or near the actual point of coupling to the structure, while bringing the system into resonance with the radio equipment at the particular operating frequency selected.

An alternative embodiment of the invention involves the utilization of the conductive structure of the rudder 16 and rudder trimmer 22, either singly or in conjunction with the elevators, as one portion of an antenna system, the remainder of the craft or a portion thereof serving as the other element of the system. The rudder post 78, upon which the rudder is mounted, may readily be insulated from its supporting brackets 80 on the vertical fin 18 by means of insulating bushings 82 employed in the same manner as the bushings 38 by which the elevator shaft 26 is insulated, as illustrated in Figure 3. The control rod 84 for the rudder is likewise provided with an insulated pivotal connection at the point where it joins the control arm 86 on the rudder post 78, the connection being similar to the arrangement shown in Figure 4.

For coupling and tuning the antenna system where the rudder comprises one portion of a series-tuned antenna system employing the structure of the craft, as the antenna, a separate coupling and tuning network is provided. This network, similar to the network 48 previously described, together with similar adjusting series reactances, is located in close proximity to the rudder post 78, such coupling and tuning apparatus being indicated generally at 88 in Figure 1. Connection to the aircraft structure is made in the manner shown in said figure, one lead being connected to the rudder post 78 and the other connecting to the adjacent fuselage structure at some exterior point thereof, as at 90. A two-wire transmission line 92 similar to the line 50 connects the coupling and tuning network 88 to the radio equipment 44, conventional switching arrangements (not illustrated) within the equipment permitting connection of either or both lines to the equipment.

Another embodiment of the invention makes use of one or more of the movable airfoils or ailerons 8 carried by the main wing 10, together with their supplementary trimming airfoils 24, as a portion of an antenna system utilizing the conductive structure of the craft. Insulation of the ailerons is effected by means of insulating bushings employed between the ailerons supporting shafts 94 and the mounting brackets 96 in the manner shown in the detail view, Figure 3. The actuating connections for controlling the ailerons and trimmers are likewise insulated at a point close to said members, this insulation being effected in any suitable manner depending on the particular arrangement of the parts, for example by insulating coupling sleeves 98 connecting control shafts 100 with the supporting shafts 94.

As in the previously described embodiments, the tuning and coupling apparatus, indicated generally at 102, is located in close proximity to ailerons to which it is connected. The apparatus is essentially similar to the network 48 and series tuning reactances 66 and 68 previously described, and is connected to the radio equipment through a two-wire transmission line 104. The tuning and coupling apparatus is connected in series between the mutually insulated structural portions, one terminal being connected to the aileron supporting shaft 94 and the other to the adjacent main wing structure.

For operation on the ultra high frequencies, it may in certain instances be desirable to employ an antenna having somewhat smaller equivalent electrical dimensions than the systems above described. An effective and self-contained antenna system for the ultra high frequencies is provided by employing in accordance with the invention, a movable airfoil, insulated from the remainder of the craft, as one portion of the antenna, and the supplementary or trimming airfoil carried by the movable airfoil and insulated therefrom and from the remainder of the aircraft structure, as the other portion of the system. As in the previously described arrangements, the tuning and coupling apparatus is connected in series between the mutually insulated portions to provide a series-tuned and series-fed antenna system operative in a manner similar to the other embodiments of the invention.

Such a system is illustrated in Figure 1, the right hand aileron 8 being insulated from the main wing 10 in the manner previously described, and the aileron trimmer 24 is insulated in substantially similar manner at its pivotal supporting points from the aileron 8 on which it is mounted. Antenna tuning and coupling apparatus, indicated at 106, is connected in series between the mutually insulated aileron and trimming airfoil, one terminal, for example, being connected to the aileron supporting shaft 94 while the other terminal is conveniently connected to the shaft 108 on which the trimming airfoil 24 is mounted. The tuning and coupling apparatus comprises an impedance matching network similar to the network 48 and series tuning reactances 66 and 68 heretofore described, so that the airfoil structure may be tuned to resonance at the desired operating frequency and a current antinode likewise caused to appear at or near the point of coupling between aileron and trimmer. A conventional two wire transmission line 110 extends from the tuning and coupling apparatus 106 in the wing of the craft to the radio equipment.

Other movable airfoils and their trimming airfoils may be employed in the manner shown to provide a plurality of self-contained antenna systems for ultra high frequency operation. Where such antenna systems are located on opposite sides of the fuselage of the craft, for example, at each end of the main wing where the ailerons and their trimmers are employed, the intervening fuselage structure serves as a partial shield between the two systems, and thereby enables the two systems to function as radio antennae substantially independent of one another.

While a particular type of coupling network has been illustrated and described as well adapted for use with the antenna system of the invention, other types of coupling arrangements may be employed to couple the radio equipment to the mutually insulated portions of the aircraft structure. Nor is the invention limited to the particular arrangements and combinations of relatively movable airfoil members set forth in the specification and illustrated in the drawing, other combinations and arrangements employing various movable airfoil members of the craft being possible to provide antenna systems of different characteristics, permitting duplex operation, directional radiation, simultaneous communication at different frequencies and the like.

Where, in the specification and in the claims, the airplane is described as having an electrically conductive structure, this shall be deemed to include, in addition to airplanes and like craft constructed entirely of metal, those having a metal frame with fabric covering, and those of composite construction of wood and metal, fabric covered, the latter types, when the metal parts are properly bonded, being substantially equivalent in operation to the all-metal craft.

Having thus described the invention in its preferred form and various modifications thereof, what is claimed is:

1. In an airplane having an electrically conductive structure and provided with radio equipment, a self-contained resonant antenna system therefor utilizing a substantial portion of said structure and adapted for operation over a range of frequencies whose half-wavelength is substantially independent of the equivalent electrical dimensions of the portion of the structure utilized, said antenna comprising a pivotally mounted airfoil member electrically insulated from another portion of the aircraft structure having different equivalent electrical dimensions, means comprising a coupling network for coupling the said mutually insulated structural portions of the craft to the radio equipment, and reactive means connected in series with one of said structural portions for altering the equivalent electrical length thereof to a value such that a current antinode appears in the vicinity of the point of coupling to the structure at the operating frequency.

2. In an airplane having an electrically conductive structure and provided with radio equipment, a self-contained resonant antenna system therefor utilizing a substantial portion of said structure and adapted for operation over a range of frequencies whose half-wavelength is substantially independent of the equivalent electrical dimensions of the portion of the structure utilized, said antenna comprising a pivotally mounted airfoil member electrically insulated from another portion of the aircraft structure having different equivalent electrical dimensions, means comprising a coupling network for coupling the said mutually insulated structural portions of the craft to the radio equipment, and inductively reactive means connected in series with the structural portion having the smaller equivalent electrical dimensions for altering the reactance to space of said portion to a value such that a current antinode appears in the vicinity of the point of coupling to the aircraft structure at the operating frequency.

3. In an airplane having an electrically conductive structure and provided with radio equipment, a self-contained resonant antenna system therefor utilizing a substantial portion of said structure and adapted for operation over a range of frequencies whose half-wavelength is substantially independent of the equivalent electrical dimensions of the portion of the structure utilized, comprising a pivotally mounted airfoil member electrically insulated from another portion of the aircraft structure, reactive means connected between said mutually insulated portions and having a value such that the equivalent electrical length of the system is substantially an even number of quarter-wavelengths of the operating frequency, and means for coupling the antenna to the radio equipment.

4. In an airplane having an electrically conductive structure and provided with radio equipment, a self-contained resonant antenna system therefor utilizing a substantial portion of said structure and adapted for operation over a range of frequencies whose half-wavelength is substantially independent of the equivalent electrical dimensions of the portion of the structure utilized comprising a pivotally mounted airfoil member electrically insulated from the remainder of the aircraft structure, means for coupling the radio equipment to the said mutually insulated structural portions of the craft at a point adjacent the insulation point, and inductively reactive means connected in series with the airfoil member and having a value such that a current antinode is produced in the vicinity of the point of coupling to the system at the operating frequency.

MALCOLM BRUCE.